United States Patent [19]

List et al.

[11] 4,092,956
[45] June 6, 1978

[54] WATER COOLED INTERNAL COMBUSTION ENGINE, PARTICULARLY A DIESEL ENGINE

[75] Inventors: Hans List, 126, Heinrichstrasse, Graz, Austria; Othmar Skatsche, Josef Greier, Bertram Obermayer, Gerhard Feichtinger, Johann Wagner, all of Graz, Austria

[73] Assignee: Hans List, Graz, Austria

[21] Appl. No.: 717,894

[22] Filed: Aug. 26, 1976

[30] Foreign Application Priority Data

Sep. 4, 1975 Austria .................................. 6849/75

[51] Int. Cl.² ............................................. F02F 1/36
[52] U.S. Cl. ........................... 123/41.74; 123/41.82 R; 123/52 MC; 123/193 CH
[58] Field of Search ............... 123/41.82 R, 41.82 A, 123/41.79, 41.74, 41.72, 193 CH, 193 H, 193 R, 52 MC, DIG. 6

[56] References Cited

U.S. PATENT DOCUMENTS

| | | | |
|---|---|---|---|
| 2,767,694 | 10/1956 | Boghossian | 123/41.82 A |
| 2,963,015 | 12/1960 | Caris | 123/41.82 A |
| 2,975,778 | 3/1961 | Wilcox | 123/41.74 |
| 3,159,148 | 12/1964 | Nallinger et al. | 123/41.82 |
| 3,420,215 | 1/1969 | Seifert | 123/41.82 |
| 3,674,000 | 7/1972 | Reisacher et al. | 123/193 CH |
| 3,691,914 | 9/1972 | Reisacher et al. | 123/193 CH |
| 3,769,948 | 11/1973 | Feichtinger | 123/41.82 |
| 3,818,878 | 6/1974 | Zaruba | 123/41.82 A |
| 3,983,852 | 10/1976 | Chatourel | 123/41.82 R |

*Primary Examiner*—Charles J. Myhre
*Assistant Examiner*—Sheldon Richter
*Attorney, Agent, or Firm*—Watson, Cole, Grindle & Watson

[57] ABSTRACT

A water cooled internal combustion engine which comprises a cylinder head cast integrally with both the cylinder block and the housing of an overhead camshaft, and which includes a cooling water room extending over all cylinders of the engine, a cooling water distributor channel extending in the longitudinal direction of the engine and arranged immediately above the exhaust ducts, which themselves extend transversely of the engine to an exterior cylinder head side wall, and jet bores communicating the distributor channel with the cooling water room of each cylinder.

5 Claims, 4 Drawing Figures

FIG.3
FIG.4
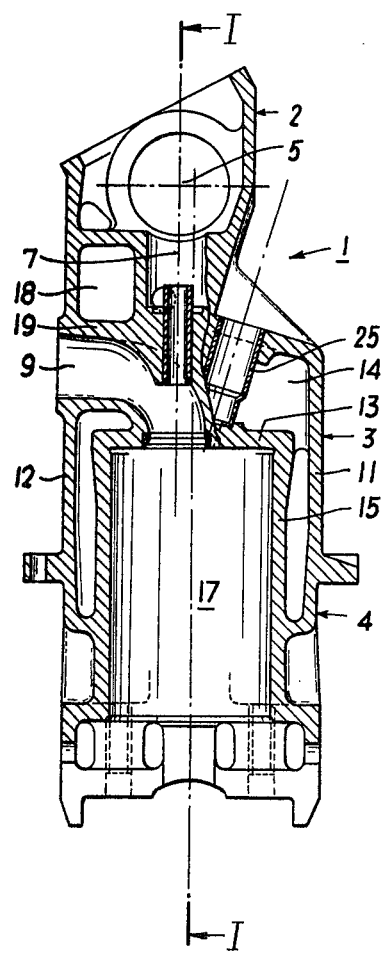
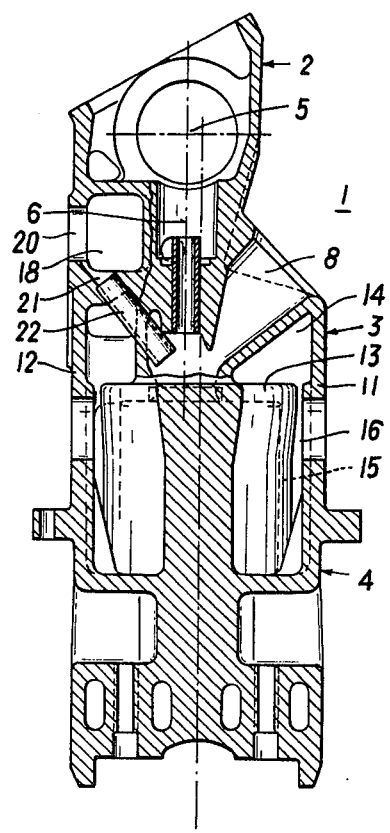

WATER COOLED INTERNAL COMBUSTION ENGINE, PARTICULARLY A DIESEL ENGINE

BACKGROUND OF THE INVENTION

This invention concerns a water-cooled internal combustion engine, and in particular a diesel engine, of the kind comprising a cylinder head which is cast integrally with the cylinder block and the housing of the overhead camshaft, with intake and exhaust valves suspended in the cylinder head, and with exhaust channels or ducts extending transversely of the engine to the exterior wall on the exhaust side, and with a cooling water space or volume extending over all of the cylinders provided in the block.

In order to preclude excessively high thermal stresses in internal combustion engines of this kind, it is necessary to cool the exhaust channels with water as far as possible over the whole of their length and circumference. However, this requirement raises certain problems and difficulties with regard to the casting technique for fitting of the cores for the channels. For this reason the water jacket core for the cylinder heads of diesel engines must normally be made in two parts. In many cases it is also difficult under the existing confined space conditions to accommodate a cooling water distributor channel having dimensions sufficient to provide a large cross section.

It is the aim of the present invention to provide an internal combustion engine of the kind specified wherein the above-mentioned problems and difficulties are obviated and favorable conditions are created for weight economy in the construction of the engine. Moreover, the invention aims to ensure maximum intensity of cooling action for the regions in the engine which are subject to high thermal stresses.

SUMMARY OF THE INVENTION

According to this invention I provide a water-cooled internal combustion engine, particularly a diesel engine, comprising a cylinder head cast integrally with the cylinder block and the housing of the overhead camshaft, intake and exhaust valves suspended in the cylinder head and exhaust ducts extending transversely of the engine to the exterior wall on the exhaust side as well as a cooling water volume extending over all of the cylinders provided, characterised in that a cooling water distributor channel extending in the longitudinal direction of the engine is arranged immediately above the exhaust ducts, and in that the cooling water distributor channel communicates with the cylinder head cooling water volume of each cylinder by means of a bore directed towards the valve and fuel jet webs of the associated cylinder. In one preferred arrangement a tube is inserted in the bore.

The invention affords a substantial economy in weight as well as, by virtue of the combination of camshaft housing, cylinder head and cylinder block in a single construction unit, an important simplification with regard to casting technique because the conventional two-part water jacket core may be dispensed with and the exhaust channel core may be introduced obliquely from above into the one-part cylinder head water jacket core whereupon the core of the cooling water distributor channel may be duly inserted.

Moreover, the arrangement according to this invention also creates very favorable cooling conditions in the region of the exhaust channels in as much as whilst these channels, in the same way as exhaust channels situated wholly within the cooling water area of the cylinder head, are cooled over the whole of their length and circumference, only the lower part of the exhaust channels is contacted by cooling water which has already been heated in the region of the cylinder head whilst the upper part of the exhaust channels is subjected to intensive cooling by cooling water entering the distributor channel at a comparatively low temperature. This arrangement for cooling the exhaust channels or ducts gives maximum consideration to the locally different thermal loads applied to the channel walls. Another advantage for a special cooling effect resides in that comparatively more construction space is available in the area above the exhaust channels for the accommodation of large cross sections for the cooling water distributor channel. As a result of the communicating connection between the cooling water distributor channel and the cylinder head cooling water volume of each cylinder by means of a per se conventional bore directed towards the webs between the valve and the fuel jet of the associated cylinder, or of a tube fitted in said bore, the familiar advantages of increased colling action for these thermally highly stressed parts of the cylinder head can be fully realised by an aimed, high-speed discharge like a jet of cooling water through the bore or tube and this is greatly assisted by the comparatively large cross sections of the cooling water distributor channel.

A conventional internal combustion engine of the kind specified at the outset hereof differs fundamentally from the arrangement according to this invention with regard to the cooling water ducting system. In such a conventional engine, instead of the cooling water distributor channel according to the present invention which communicates with the individual cooling water volumes for all of the cylinders, there is provided a continuous or coherent single cooling water volume common to all the cylinders, which is vertically subdivided by a strong-walled partition situated in the plane of the bases or bottoms of the cylinder heads. The lower part of this cooling water volume, which contains the cylinder sleeves, is in communication with the upper part of the cooling water volume situated in the cylinder head region only by means of comparatively narrow transfer flow sections at the two end walls of the engine block. It is obvious that such a design of the cooling water jacket or volume does not permit the achievement of an even cooling action for the combined unit of the cylinder head and the cylinder block which would give full consideration to locally varying cooling demands, and that irregular thermal expansions may occur under higher thermal engine loads which may produce deformations of the cylinder head bases and of the cylinder sleeves, and even lead to the formation of heat cracks. Moreover the design and conformation of the cooling water areas in the conventional system raise considerable problems with regard to casting technique.

According to a preferred form of execution of this invention the lower definitive wall of the cooling water distributor channel at the same time forms the upper end or definitive wall of the exhaust channels. This ensures an intensive heat exchange between the exhaust channel walls and the cooling water flowing through the distributor channel, obviating a doublewalled construction in this region and thus also reducing overall constructional dimensions. In such an arrangement the dividing wall between the cooling water distributor channel and the exhaust channels may be of substantially the same wall thickness as the exhaust channels themselves.

Lastly, particularly favorable cooling conditions are achieved, according to a preferred form of this invention, by making the cooling water distributor channel rectangular in cross section to occupy the entire cross sectional width available between the exterior wall on the exhaust side and the intake and exhaust valves which are arranged in a row in the longitudinal direction of the engine.

DESCRIPTION OF THE DRAWINGS

One preferred embodiment of the invention will be hereinafter more specifically described with reference to the accompanying drawings wherein:

FIG. 3 is a cross section of the unit on the line III—III of FIG. 2, and FIG. 4 is a further section taken on line IV—IV in FIG. 1.

DESCRIPTION OF THE PREFERRED EMBODIMENT

Figure 1:
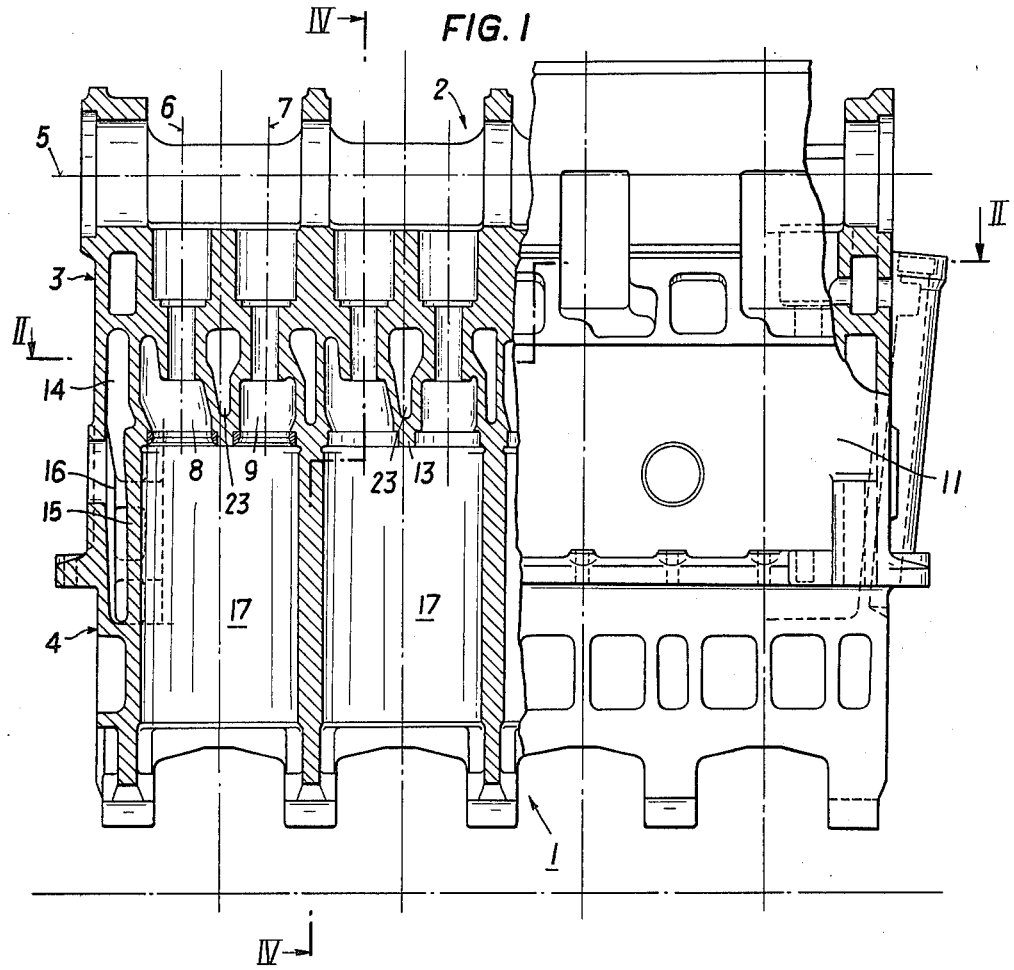
FIG. 1 is a part-sectional side elevation of a constructional unit for a diesel engine according to the present invention, comprising the camshaft housing, the cylinder head and the cylinder block, the part shown in section being along the line I—I in FIG. 3.
Figure 2:
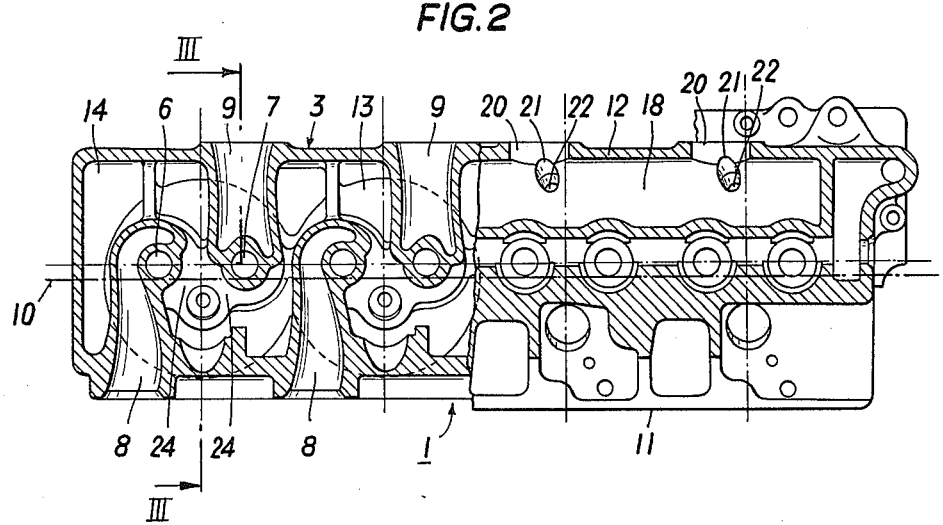
FIG. 2 is a sectional plan view of the unit on the line II—II of FIG. 1.

The integral unit generally designated comprises a camshaft housing 2, a cylinder head 3 and a cylinder block 4, and is part of a water cooled, four cylinder four stroke diesel engine with direct fuel injection, with intake and exhaust valves arranged in suspension in a row extending in the longitudinal direction of the engine in the cylinder head 3 and actuated by an overhead camshaft, indicated merely by its axis 5. The respective axes of the intake and exhaust valves are designated 6 and 7. The intake ducts 8 and the exhaust ducts or channels 9 extend transversely of the medial longitudinal engine plane 10. The approximately box-shaped unit 1 has substantially plane walls, the exterior wall on the intake side being shown at 11 and the exterior wall on the exhaust side at 12.

The significant characteristic features for the inventive construction of this internal combustion engine are the conformation and design of the cooling water volume, the ducting of the cooling water, and the resulting favorable cooling conditions for the thermally highly stressed parts of the engine. A cylinder head cooling water volume 14 which is situated above the cylinder head base or bottom 13 communicates with a cooling water volume 16 surrounding cylinder sleeves 15 via relatively large transfer flow cross-sections in the circumferential region of the cylinder head bases 13. Supply and distribution of cooling water to the individual cylinders 17 occurs through a cooling water distributor channel 18 of substantially rectangular cross section extending in the longitudinal direction of the engine immediately above the exhaust ducts 9. A common wall 19 separates the channel 18 and the exhaust ducts 9.

The cooling water distributor channel 18 is connected via cooling water intake ports 20 to the cooling circulation system of the engine and occupies the entire available cross sectional width between the exterior side wall 12 on the exhaust side and the parts of the valve actuation or drive (not shown). The vertical dimension of the distributor channel 18 is essentially limited or determined only by the position of the camshaft. Obliquely inclined bores 21 extend from the lower part of the distributor channel 18, each such bore 21 having fitted therein a jet-like tube 22, sealingly inserted in the bore with its axis directed, in per se conventional manner, towards the middle region of the cylinder head base 13. In this region a web 23 extends between the intake and exhaust valve, and two webs 24 which are situated, in each case, between one of the valves and the fuel jet pipe 25 of injection nozzle (not shown).

As a result of the above-described cooling water ducting system, the engine parts which are subject to the severest thermal loads, that is to say, the exhaust ducts 9, the valve webs 23 and the jet webs 24, receive a cooling action which is accurately adjusted to their cooling needs, which means that undue thermal expansions and tensions are largely avoided. The exhaust ducts 9, whereof the walls are situated for the most part within the cooling water volume 14 of the cylinder head, receive intensified cooling action in the region of their upper wall 19 which is in direct contact with the hot exhaust gases, from the distributor channel 18 through which the coolant flows while it is still comparatively cool. The valve webs 23 and the jet webs 24 are intensively cooled by the cooling water flowing at high speed through the tubes 22, whereby the formation of otherwise frequency occurring heat cracks is safely prevented. The large transfer flow sections between the cylinder head cooling volume 14 and the cylinder block cooling volume 16 also ensure adequate cooling of the cylinder sleeves 15. For the intake ducts 8, which are subject to much lower thermal loads, adequate cooling action is ensured if, as shown in FIG. 4, only their lower regions are contacted by the cooling water of the cylinder head cooling water volume 14, dispensing with the need for special cooling of their upper outer face. This arrangement affords additional casting advantages because it also dispenses with the need of a two-part water jacket core to enable the intake core to be fitted.

The illustrated and described example of execution of this invention reveals that this particular constructional arrangement presents not only casting technique advantages and special cooling effects, but also allows extreme weight economy in the construction of the engine.

We claim:

1. A water cooled internal combustion engine comprising a cylinder block, a cylinder head cast integrally with the cylinder block, an overhead camshaft housing cast integrally with the cylinder head and the cylinder block, an overhead camshaft located in said camshaft housing, intake and exhaust valves and fuel injection nozzles suspended in the cylinder head, means forming exhaust ducts which extend transversely of the engine to an exterior wall on the exhaust side of the engine, means forming a cooling water chamber extending over all cylinders of the engine, means forming a cooling water distributor channel extending in the longitudinal direction of the engine and positioned immediately above the exhaust ducts, said cooling water distributor channel communicating with the cylinder head cooling water chamber of each cylinder via means forming a bore directed towards a cylinder head wall area adjacent the intake and exhaust valves and the fuel injection nozzle of the associated cylinder.

2. Internal combustion engine according to claim 1, wherein a tube means is fitted in each of said bores.

3. Internal combustion engine according to claim 1, wherein the cooling water distributor channel and the adjacent exhaust ducts are separated by a common wall.

4. Internal combustion engine according to claim 1, wherein the intake and exhaust valves are arranged in a row in the longitudinal direction of the engine and the cooling water distributor channel is of rectangular cross sectional conformation and occupies the entire available cross sectional width between said exterior side wall on the exhaust side of the engine and the intake and exhaust valves.

5. Internal combustion engine according to claim 1, wherein said engine is a diesel engine.

* * * * *